United States Patent [19]

Gatellier

[11] Patent Number: 5,203,310
[45] Date of Patent: Apr. 20, 1993

[54] PROCESS FOR REDUCING THE HARMFUL COMPONENTS IN EXHAUST GAS AND ENGINE IMPLEMENTING THE PROCESS

[75] Inventor: Bertrand Gatellier, Boulogne, France

[73] Assignee: Institut Francais du Petrole, Rueil-Malmaison, France

[21] Appl. No.: 783,780

[22] Filed: Oct. 29, 1991

[30] Foreign Application Priority Data

Oct. 30, 1990 [FR] France ................... 90 13602

[51] Int. Cl.⁵ .................................................. F02M 25/07
[52] U.S. Cl. ................................... 123/568; 123/571
[58] Field of Search .............. 123/568, 569, 570, 571, 123/316

[56] References Cited

U.S. PATENT DOCUMENTS

| | | | |
|---|---|---|---|
| 4,173,203 | 11/1979 | Nakajima et al. | 123/568 |
| 4,271,810 | 6/1981 | Lancaster | 123/569 X |
| 4,276,865 | 7/1981 | Hamai | 123/568 X |
| 4,328,781 | 5/1982 | Morita | 123/570 |
| 4,674,464 | 6/1987 | Akagi | 123/571 |
| 4,721,089 | 1/1988 | Currie et al. | 123/571 |
| 4,735,186 | 4/1988 | Parsons | 123/568 |
| 4,854,291 | 8/1989 | Elsbett et al. | 123/569 |
| 4,856,473 | 8/1989 | Kawai et al. | 123/570 X |
| 4,875,455 | 10/1989 | Hashimoto et al. | 123/568 |
| 4,924,840 | 5/1990 | Wade | 123/571 |

FOREIGN PATENT DOCUMENTS

| | | |
|---|---|---|
| 3146654 | 6/1983 | Fed. Rep. of Germany . |
| 1560334 | 3/1969 | France . |
| 0180742 | 10/1983 | Japan . |
| 0530554 | 12/1972 | Switzerland . |

Primary Examiner—Willis R. Wolfe
Attorney, Agent, or Firm—Antonelli, Terry, Stout & Kraus

[57] ABSTRACT

The process essentially consists of reintroducing into the cylinder, during the phase of intake of the fresh gas, a more or less large part of the waste gas. It is achieved by providing each cylinder (1) with a branch pipe (7) communicating with the cylinder through an auxiliary inlet valve (8) whose opening period corresponds to the intake top dead center, and with the inlet pipe (6). A shutter or a plug (9) allows to control the flow of waste gas recycled at the intake according to the working conditions of the engine. A decrease in the harmful substances and an improvement in the engine efficiency can be obtained at the same time thereby.

21 Claims, 2 Drawing Sheets

PROCESS FOR REDUCING THE HARMFUL COMPONENTS IN EXHAUST GAS AND ENGINE IMPLEMENTING THE PROCESS

BACKGROUND OF THE INVENTION

The present invention relates to a process for reducing harmful components in the waste gas exhausted from an internal-combustion engine and for increasing the power supplied by the engine through the recycling of a portion of the waste gas.

The implementing of the process notably enables meeting to the ever stricter standards applied to spark-ignition engines. As a matter of fact, studies have shown that the recycling of a portion of the gas exhausted from the cylinders not only causes a reduction in the nitrogen oxides emitted, but also a significant decrease in the amount of unburned hydrocarbons at the end of the exhaust phase. The main difficult to be solved is the control of the flow of recycled gas according to the working conditions of the engine.

The principle of the taking of a fraction of the gas burned by an engine in the exhaust pipes and the reintroducing thereof, after cooling, into the inlet channels of the cylinders in order to decrease the discharge of certain harmful components is well-known. Such a recycling can be implemented in several ways.

For example, in CH 530,554, a process and a device for allowing recycling of exhaust gas is proposed wherein a partial re-opening of the exhaust valves during the phase of intake of fresh gas enables a redrawing of a portion of the exhausted waste or exhaust gas into each cylinder at the end of the previous combustion cycle. This process is essentially implemented by modifying the shape of the cams controlling the exhaust valves in order to impose an additional partial re-opening. This process, which is applied to engines having two valves per cylinder, does not allow the attainment of an optimum effect, whatever the working conditions of the engine may be, because the partial re-opening of the exhaust valve is imposed by the shape chosen for the actuating cam and is therefore immutable in many cases.

Processes for improving the efficiency of an engine and having the effect of meeting the standards for exhaust gas discharge are also well-known, with these processes being implemented in engines equipped with a double inlet valve per cylinder and being based upon the principle of modulation of the air flow passing through one of the two inlet valves. The prior art for this type of engine is, for example, described in an article of SAE Technical Paper Series No. 900,227 by Mikulic et al.

U.S. Pat. No. 4,173,203 describes a system for decreasing the exhaust gases discharged from an internal-combustion engine comprising, per cylinder, an additional inlet valve connected with an air inlet circuit comprising a pump, a tank for stocking the air compressed by the pump and an auxiliary circuit allowing a diversion towards the pump inlet a controlled part of the exhaust gas of the engine.

Patent DE 3,146,654 describes an analogous system wherein a controlled part of exhaust gas is reinjected into the cylinders through an auxiliary valve after being compressed and stored in a storage capacity.

Experience shows that the rate of harmful discharges varies during each exhaust phase, with a peak towards the end of this phase, and that the decrease in harmful discharges is stronger if these peaks can be more particularly recycled. The existence of a rather long recycling circuit with means for the compression and the storing of fractions of waste gas has the effect of diluting the peaks in question. The effect of the recyclings on the harmfulness of the discharges is therefore reduced. This dilution may even lead to a degradation of the combustion and, moreover, to an increase in the rate of unburned hydrocarbons.

SUMMARY OF THE INVENTION

The process according to the present invention allows a reduction in the harmful exhaust discharges of an internal-combustion engine and increases a power thereof by avoiding the drawbacks of the prior processes. The process of the present invention applies to an engine comprising, per cylinder, at least one inlet valve connected by a fresh gas inlet pipe during an intake phase and at least one exhaust valve connected with a waste gas exhaust pipe during an exhaust phase, and it comprises a reinjection of a fraction of the volume of the exhaust gas.

The process of the present invention comprises establishing a controlled direct recycling of the waste gas by way of an auxiliary pipe communicating at a first end with one of said intake or exhaust pipes and control means allowing reinjecting of the exhaust or waste gas during part of the intake phase and during a recycling time interval where exhaust or waste gas is the richest in harmful discharges, with the time interval being permanently adapted to the load conditions of the engine.

According to the present invention, the recycling is achieved by connecting the end of the auxiliary pipe opposite the first pipe with the inside of the cylinder by an auxiliary valve controlled in such a manner that the opening time interval thereof is positioned around the intake top dead center, with the position thereof being selected according to the load of the engine.

In accordance with further features of the present invention, the recycling is carried out by connecting, through the auxiliary pipe fitted with the control means, the intake and the exhaust pipes, with the auxiliary pipe coming out directly close to the exhaust valve, and with the control means being controlled in order to vary the recycling time according to the load of the engine.

With the very short recycling circuit directly or indirectly established between the inlet or exhaust pipes and the cylinder, a very noticeable decrease in the fraction of unburned hydrocarbons and most often an improvement of the yield thereof are obtained in all cases.

The auxiliary pipe communicates, for example, with the inlet pipe.

The extent of the recycling is, for example, varied between a first minimum value and a second minimum value appropriate for engine loads higher than a fixed threshold, according to the rotating speed of the engine and to the negative pressure prevailing at the intake.

The first minimum value is selected, for example, for low engine rotational speeds and low engine loads. This minimum value can also be selected for high engine loads.

The timing of the auxiliary valve can be adjusted in such a way that it is also used for the injection of fresh gas.

The recycling is, for example, controlled by a sealing element inserted on the auxiliary pipe or else by modifying the time interval of the opening of the auxiliary valve.

Applying the process according to the invention enables a substantial decrease in the discharges of harmful substances such as nitrogen oxides and unburned hydrocarbons. This is notably the case in the implementing procedure where the auxiliary pipe is connected with the inlet pipe, the recycled fraction being taken within the cylinder, at the end of the exhaust period where the proportion of unburned mixture is the largest.

Besides, in all the cases where the auxiliary valve is also used for the intake into the cylinder, the applying of the process according to the invention leads to an increase in the injection flow and thereby to an improved efficiency.

The four-stroke internal-combustion engine implementing the process comprises at least one cylinder fitted with at least one inlet valve connected with a fresh gas inlet pipe and at least one exhaust valve connected with a waste gas exhaust pipe.

It comprises an auxiliary pipe connected with the inlet pipe, at a first end, an auxiliary valve for intermittently linking the auxiliary pipe to the inside of the cylinder, and control means for reintroducing into the cylinder by the auxiliary pipe a fraction of waste gas permanently adapted to the working conditions of the engine.

The control means comprise, for example, an auxiliary valve inserted on the auxiliary pipe or a controlled-opening variable sealing element inserted on said auxiliary pipe.

The control means can also comprise parts for varying the time interval of opening of the auxiliary valve, these parts being, for example, of the electromagnetic type.

BRIEF DESCRIPTION OF THE DRAWINGS

Other features and advantages of the process and of the engine according to the invention will be clear from reading the description hereafter of the embodiments given by way of non limitative examples, with reference to the accompanying drawings wherein.

DESCRIPTION OF THE PREFERRED EMBODIMENTS

Figure 1:
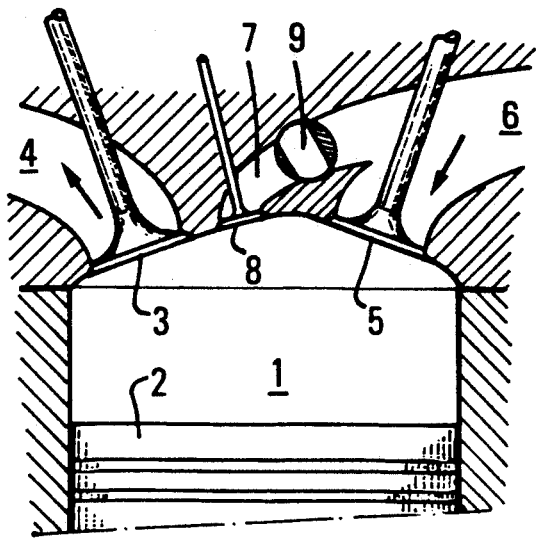
FIG. 1 is a partial cross-sectional view of a cylinder with the auxiliary valve thereof allowing the implementing of the invention according to a first embodiment.

A shown in FIG. 1 the cylinder 1 (or each cylinder), within which a piston 2 slides, communicates through an exhaust valve 3 with an exhaust pipe 4. The cylinder also communicates by a main inlet valve 5 with an inlet pipe 6. The control means allowing the cyclic opening of the two valves 3 and 5 are of a well-known type, including, for example, a cam or the like (not shown).

The engine according to the invention is essentially distinguished by the existence of a possible controlled auxiliary communication between the inlet pipe 6 and the cylinder 1. This controlled communication is achieved by an auxiliary pipe 7 coming out into cylinder 1 by an auxiliary valve 8, and into the inlet pipe 6. A control means such as a plug or shutter 9 connected with control means (not shown) outside the engine, is arranged in the auxiliary pipe 7. The opening of the auxiliary valve 8 is, for example, cyclically controlled like the opening of the two main valves 3 and 5, by, for example, a cam (not shown).

Figure 2:
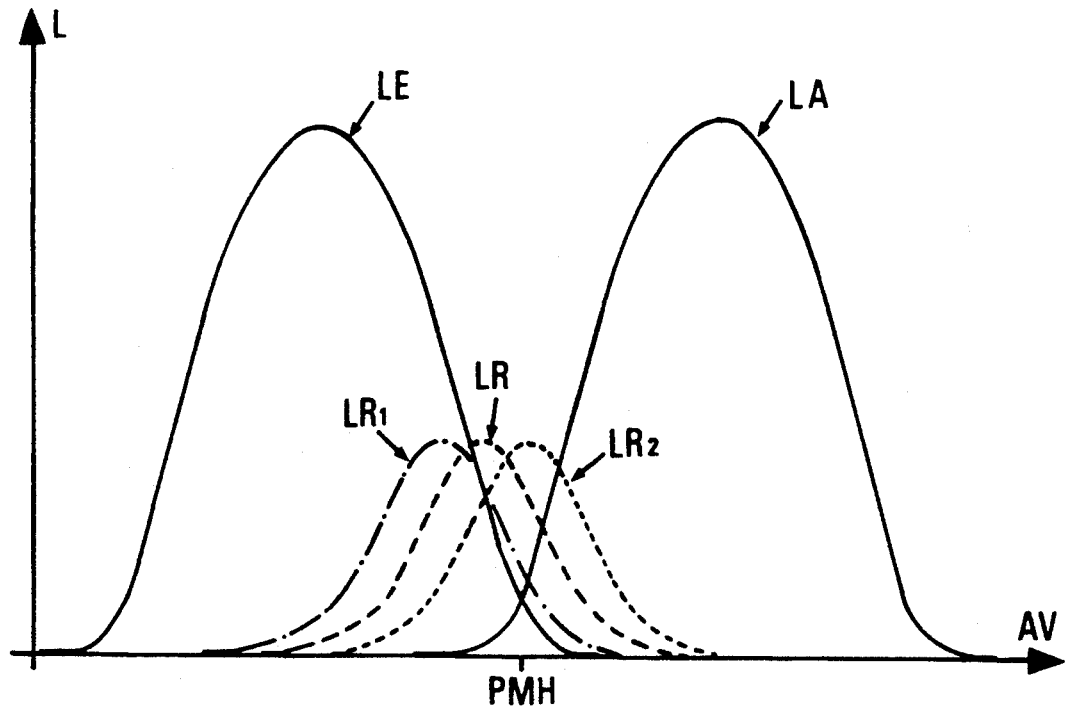
FIG. 2 is a graphical illustration the angular position of the crankshaft, the respective lift curves of the exhaust valve and of the two inlet valves, the main valve and the auxiliary valve, during the same engine cycle.

The means for controlling the auxiliary valve 8 are arranged in such a way that the opening time interval thereof takes place around the intake top dead center (PMH) and thus partly covers the corresponding intervals of the two valves 3 and 5. This allows an exhaust at each cycle of a fraction of the volume of exhaust or waste gas through the auxiliary valve 8 by the auxiliary pipe 7 towards the inlet pipe 6, this fraction being reintroduced into the cylinder mainly through the main inlet valve 5. As shown in FIG. 2, according to the adjustment of the auxiliary valve 8 which displaces the opening curve LR more or less in relation to the curve (LE) of the exhaust valve 3 between two extreme positions LR1, LR2, the duration of the waste gas reintroduction is more or less great.

According to another embodiment, an auxiliary valve and control means allowing a variation of the opening "window" as well as for the duration thereof as for the position thereof are used and, in this case, the shutter or plug 9 can possibly be eliminated.

As an example, the opening windows of the three valves can be distributed according to the top dead center (PMH) and to the bottom dead center (PMB) and in reference to the angular position (°v) of the crankshaft, as shown hereunder.

The different timings are given for the same minimum height of lift of the valves, for example 0.7 mm, the three valves being lifted by conventional cam-type means.

| Intake | 0 | 44 | opening | 1° v before TDC (PMH) |
| | | | closing | 46° v after BDC (PMB) |
| Exhaust | 0 | 36 | opening | 43° v before BDC (PMB) |
| | | | closing | 3° v before TDC (PMH) |
| 3rd valve | 0 | 16 | opening | 70° v before TDC (PMH) |
| | | | closing | 70° v after TDC (PMH) |

The maximum lift height of the auxiliary valve 8 is different from the one of the two main valves 3 and 5.

The values above can be changed when the process according to the invention is used for an engine where each cylinder comprises two inlet valves with an inlet pipe 6 coming out tangentially into the cylinder to obtain, by swirl, better aerodynamics, and another pipe called neutral pipe which is controlled through a plug or a shutter 9. In this case, the tangential pipe is pipe 6, and the neutral pipe is the auxiliary pipe 7 with the shutter or sealing plug 9 as described previously. The plug or shutter 9 is closed for low loads and the main inlet valve 5 is opened slightly before the top dead center (PMH) and closed near the bottom dead center (PMB). The opening window of the auxiliary valve 8 is distributed in the same way between 40° v before the top dead center and 50° v after the bottom dead center.

The control shutter or plug 9 allows a modulation of the flow of exhaust or waste gas allowed to reenter during the opening time of the auxiliary valve 8. The following adjustments can, for example, be chosen for the indicated Mean Intermediate Pressures (MIP):
very low loads and idling (MIP<2 bars): shutter closed
average and high loads (MIP>4 bars): shutter open It is also possible, in certain cases, to close the control shutter or plug 9 when the engine works at full load.

Between these two states, a control system modulates the opening of the shutter or plug 9 according to the engine speed and to the negative pressure at the intake.

Figure 3:
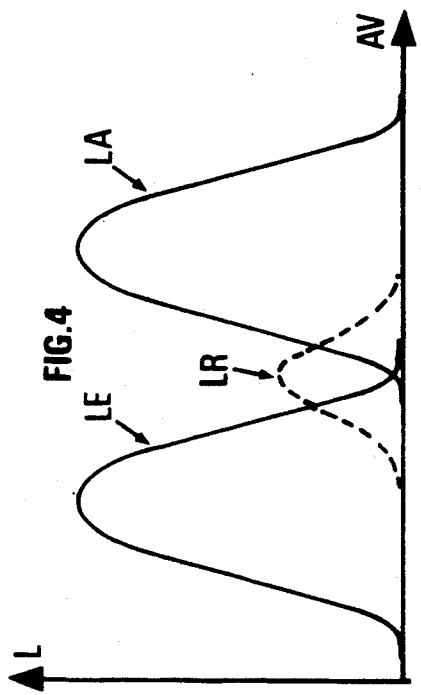
FIGS. 3 to 5 are graphical illustrations of similar curves as shown in FIG. 2 with different timings depending on whether the engine works at low load, at average load or at high load.
Figure 5:
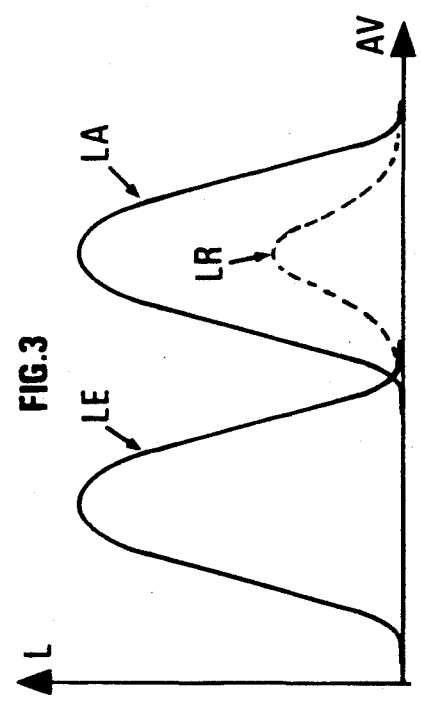
Figure 4:
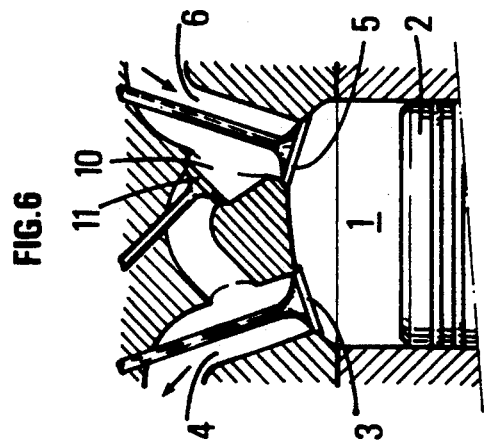

If there is a valve 8 fitted with a control system allowing a more extensive modification of the position of the opening window thereof and of the top dead center (PMH) the intervention possibilities can still be widened according to the engine load as shown in FIGS. 3 to 5, in order to combine, at best, the delivered power and a low rate of harmful components in the waste gas.

The gas recycling is, for example, totally suppressed for low loads (FIG. 3). If the valve 8 is opened at each cycle by control means of the mechanical type, the opening window LR is preferably totally shifted towards the intake curve LA and the plug or shutter 9 is closed. In case the valve 8 is of the electromagnetic control type, the control thereof is modified so that it remains closed.

For average loads, the opening window is positioned around the top dead center (FIG. 4) by adjusting the duration of reintroduction of the waste gas according to the load.

For higher loads (FIG. 5), the opening window LR is again totally shifted towards the intake curve LA in order to have it work as an additional inlet valve. The relative positioning of the different curves (FIG. 5) is analogous to the one of FIG. 3, but here the additional intake effect is graded by opening more or less the control plug 9.

Figure 6:
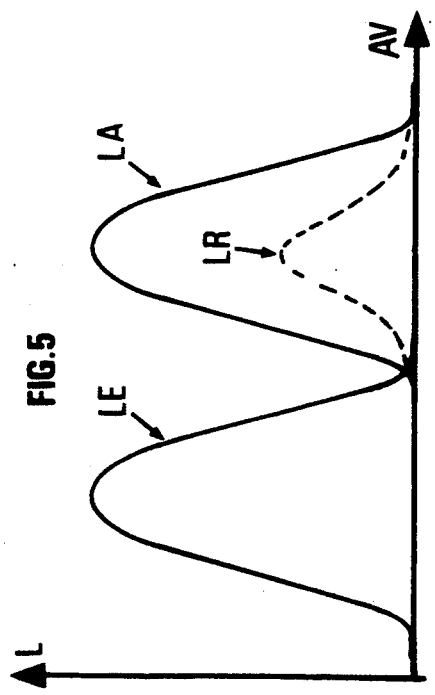
FIG. 6 is a partial cross-sectional view of the cylinder constructed in accordance with a second embodiment of the invention.

According to the embodiment of FIG. 6, the process can also be implemented by an auxiliary pipe 10 coming out at the two opposite ends thereof respectively in the exhaust pipe 4 and in the inlet pipe 6 directly near the exhaust valve 3 preferably and by a variable communication means inserted on this auxiliary pipe, such as a valve 11. In this case, the recycling of exhaust of waste gas according to the engine load is graded in an analogous way, by modifying the position of the opening window of the auxiliary valve 11 around the top dead center PMH.

In the implementing the process which has been described, the recycling of the waste gas was carried out by connecting the auxiliary pipe 8 with the inlet pipe. This auxiliary pipe could nevertheless be connected with the exhaust pipe without departing from the scope of the invention, with the waste gas being taken after coming out of the cylinder.

The process according to the invention mainly applies to spark-ignition four-stroke engines, possibly super-charged and possibly fitted with a direct injection system.

In all cases, a very noticeable decrease in the nitrogen oxide rate and the unburned hydrocarbons is obtained in the exhaust gas, and, at the same time, an improved filling of the cylinders.

I claim:

1. A four-stroke internal combustion engine comprising at least one cylinder provided with at least one intake valve connected with a fresh gas intake pipe during intake phases and at least one exhaust valve connected with a waste exhaust pipe during exhaust phases, an auxiliary pipe communicating at a first end with said intake pipe and at a second end with the exhaust pipe directly out of said exhaust valve, an intermittent closing means for controlling reinjection of waste gas through said auxiliary pipe, and control means for controlling opening of said intermittent closing means at each cycle during an opening window of at least one of a duration and phasing of said intermittent closing means in dependence upon load conditions of the engine, thereby allowing reinjection of waste gas during a selected part of each intake phase where waste gas is the richest in harmful discharges.

2. A process for reducing the harmful discharges of an internal-combustion four-stroke engine and for increasing the power thereof through a reinjection of a fraction of a volume of waste gas, the engine comprising per cylinder at least one inlet valve connected through a fresh gas intake pipe during an intake phase and at least one exhaust valve connected with a waste gas exhaust pipe during an exhaust phase, the process comprising the steps of:

establishing a controlled direct recycling of the waste gas through an auxiliary pipe communicating at a first end with said intake pipe and at a second end with the exhaust pipe directly out of the exhaust valve, said auxiliary pipe being provided with an intermittent closing means; and controlling at each cycle said intermittent closing means for providing the same with an opening window for reinjecting waste gas, at least of the duration and phasing of said intermediate closing means depending on the load conditions of the engine, thereby allowing reinjection of waste gas during a selected part of each intake phase where waste gas is the richest in harmful discharges.

3. A process for reducing the harmful discharges of an internal-combustion four-stroke engine and for increasing the power thereof through a reinjection of a fraction of a volume of waste gas, the engine comprising per cylinder at least one inlet valve connected through a fresh gas intake pipe during an intake phase and at least one exhaust valve connected with a waste gas exhaust pipe during an exhaust phase, the process comprising the steps of:

establishing a controlled direct recycling of the waste gas achieved through an auxiliary pipe communicating at a first end with one of said intake pipe and exhaust pipe and opening a second end into said cylinder;

providing an intermediate closing means in the auxiliary pipe; and controlling at each cycle said intermediate closing means for providing the same with an opening window at least one of the duration and the phasing of said intermediate closing means depending upon load conditions of the engine, thereby allowing reinjection of the waste gas during a selected part of each intake phase where the waste gas is the richest in harmful discharges.

4. A process according to claim 3, wherein said first end of the auxiliary pipe opens into said intake pipe.

5. A process according to one of claims 3 or 2, wherein said opening window is positioned around an intake top dead center position.

6. A four-stroke internal-combustion engine comprising at least one cylinder provided with at least one inlet valve connected with a fresh gas intake pipe during intake phases and at least one exhaust valve connected with a waste gas exhaust pipe during exhaust phases an auxiliary pipe communicating at a first end with one of said intake pipe and exhaust pipe and opening at a second end into said cylinder, intermittent closing means for controlling reinjection of waste gas through said auxiliary pipe, and control means for controlling an opening of said intermittent closing means at each cycle during an opening window at least one of the duration and phasing of said intermittent closing means in dependence upon load conditions of the engine thereby allowing reinjection of waste gas during a selected part of each intake phase where waste gas is the richest in harmful discharges.

7. An engine as claimed in claim 6, wherein said control means comprise a controlled-opening variable sealing element inserted in said auxiliary pipe.

8. An engine as claimed in claim 6, wherein the control means comprise an auxiliary valve inserted in the auxiliary pipe.

9. An engine as claimed in claim 8, wherein said valve is of a type with a variable opening time interval.

10. An engine as claimed in claim 8, wherein the auxiliary pipe communicates with an inside of the cylinder through said auxiliary valve.

11. An engine as claimed in one of claims 6, 7, 8 or 9, wherein the second end of the auxiliary pipe communicates with the cylinder by intake pipe and the intake valve.

12. An engine as claimed in one of claims 6, 7, 8, 9 or 10, wherein said control means are electromagnetic.

13. A process for reducing harmful discharges of an internal-combustion four-stroke engine and for increasing power thereof through a reinjection of a fraction of a volume of waste gas, the engine comprising per cylinder at least one inlet valve connected through a fresh gas intake pipe during an intake phase and at least one exhaust valve connected with a waste gas exhaust pipe during an exhaust phase, the process comprising the steps of:

establishing a controlled direct recycling of the waste gas through an auxiliary pipe communicating at a first end with one of said intake pipe and exhaust pipe;

allowing the reinjection of the waste gas during a part of the intake phase and during a recycling time interval where the waste gas is the richest in harmful discharges, said recycling time interval being permanently adapted to load conditions of the engine; and wherein the step of allowing is carried out by communicating a second end of the auxiliary pipe opposite the first end with an interior of the cylinder through an auxiliary valve and controlling the auxiliary valve in such a manner that and opening time interval thereof is positioned around the intake top dead center, with the position of the auxiliary valve being selected in accordance with the load conditions of the engine.

14. A process as claimed in claim 13, wherein the auxiliary pipe communicates with the exhaust pipe.

15. A process as claimed in claim 13, wherein the auxiliary pipe communicates with the intake pipe.

16. A process as claimed in claim 15, wherein an extent of said recycling is varied between a first minimum value and a second minimum value suited to engine load conditions higher than a fixed threshold, according to a rotational speed of the engine and to a negative pressure prevailing at the intake.

17. A process as claimed in claim 16, wherein the first minimum value is selected for low rotational speeds and low engine load conditions.

18. A process as claimed in one of claims 16 or 17, wherein a closing position for said auxiliary valve is selected for high engine load conditions.

19. A process as claimed in one of claims 15, 16 or 17, further comprising the step of setting a timing of the auxiliary valve in such a manner that the auxiliary valve is also used for an injection of fresh gas.

20. A process as claimed in one of claims 15, 16 or 17, wherein said recycling is controlled by a sealing element inserted in the auxiliary pipe.

21. A process as claimed in one of claims 15, 16 or 17, wherein said recycling is controlled by modifying an opening time interval of the auxiliary valve.

* * * * *